June 3, 1930.  J. EDGAR  1,760,938
MICROMETER DEVICE
Filed July 11, 1929
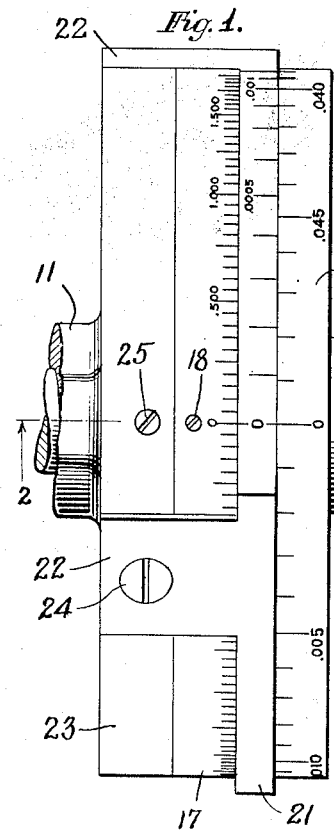
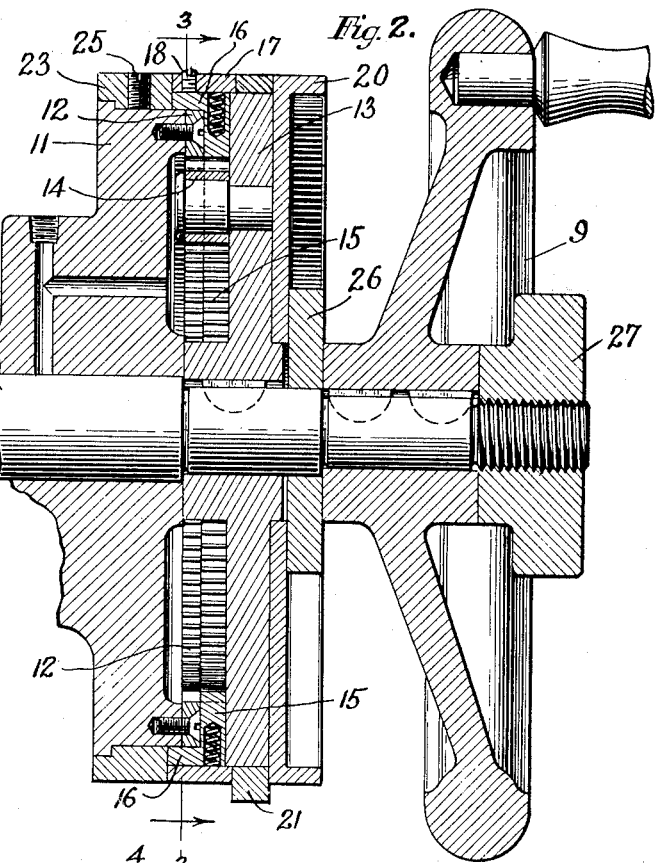
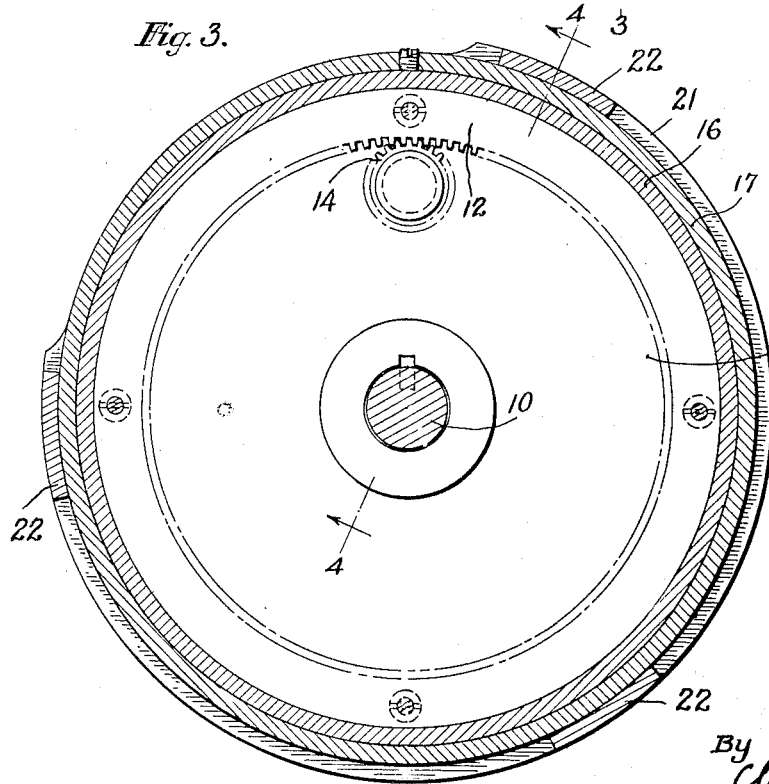
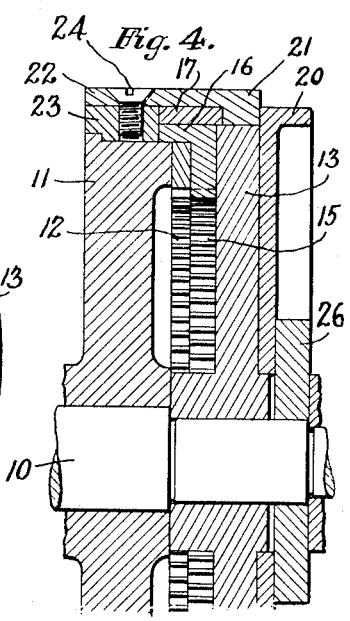
Inventor
John Edgar
By Churchill Parker & Carlson
Attys Patented June 3, 1930

1,760,938

UNITED STATES PATENT OFFICE

JOHN EDGAR, OF ROCKFORD, ILLINOIS, ASSIGNOR TO BARBER-COLMAN COMPANY, OF ROCKFORD, ILLINOIS, A CORPORATION OF ILLINOIS

MICROMETER DEVICE

Application filed July 11, 1929. Serial No. 377,391.

My invention relates generally to movement indicating devices and more particularly to a micrometer device mounted on a rotatable shaft and adapted to indicate the amount of rotation of said shaft.

The general object of my invention is to provide a novel micrometer device for indicating the extent of movement of one member with respect to another and embodying two movable scales together with a vernier, each of said scales being operable in timed relation to the other.

Another object of the invention is to provide such a micrometer device in which the scales may be independently set at zero for any given position of the member and readings may be taken from such position.

Other objects and advantages will become apparent from the following description taken in connection with the accompanying drawings, in which:

Figure 1 is a fragmentary plan view of a micrometer device embodying the features of the present invention.

Figure 2 is a vertical sectional view of the device taken along the line 2—2 of Fig. 1.

Figure 3 is a fragmentary vertical sectional view of the device taken along the line 3—3 of Fig. 2.

Figure 4 is a fragmentary sectional view taken along the line 4—4 of Fig. 3.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

A micrometer device such as is described herein is especially adapted for use on machine tools such, for example, as the machine described in my copending application, Serial No. 343,451 filed Feb. 28, 1929. Such a machine includes a manually operable shaft by the rotation of which it is possible to move a tool-carrying head a determinable distance toward or away from a work support, the distance being indicated by readings of this device.

The micrometer device constituting the present invention in its preferred form comprises generally a support, a member movable relative to said support, and means for indicating the amount of movement of said member, said means being capable of being reset to a zero indication at any position to which the member has been moved. In the present instance, the movable member is a shaft 10, the amount of the rotation of which it is desired to read, and is rotatably mounted in a support 11. A hand wheel 9 is keyed to the shaft 10 to permit the latter to be manually turned. The means for indicating the amount of movement of the shaft 10 relative to the support 11 comprises generally a stationary zero mark and two scales movable relative to said mark in timed relation to each other and to said shaft to permit reading the amount of movement of said shaft. To move one of the scales, gear mechanism is provided driven by the shaft while the other scale is directly connected with the shaft.

As illustrated herein, the above mentioned gear mechanism includes a stationary internal gear 12 secured to the face of the support 11 as by screws. Adjacent the gear 12 is a member or disk 13 keyed to the shaft 10. A pinion 14 is rotatably mounted on the disk 13 eccentrically thereof and meshes with the gear 12. Between the gear 12 and the disk 13 is a movable internal gear 15 also meshing with the pinion 14. The gear 15 has an external flange portion 16 surrounding a portion of the support 11 to permit the gear 15 to be rotatably mounted thereon.

Gear 12 being stationary and meshing with the pinion 14, it is evident that, as the shaft 10 is rotated, the pinion is rotated about its own axis and the movable internal gear 15 will be advanced or moved rearwardly relative to the gear 12 depending upon whether it has more or fewer teeth than the gear 12. In the present instance it has a greater number of teeth than the gear 12 and is caused to advance.

The first of the movable scales mentioned above comprises a ring 17 surrounding the movable internal gear 15 and adjustably secured thereto as by a set screw 18. The second of said scales is on the periphery of a disk 20 clamped to the disk 13. Between the two scales is a ring 21 upon which a zero mark is placed. Extending toward the support 11, the ring 21 has three arms 22 which are secured to another ring 23 by screws 24. The ring 23 encircles the support 11 and is adjustably secured thereto as by a set-screw 25. Thus, the zero mark is held stationary while the two scales are moved relative thereto, one through the medium of the gears and the other by being clamped to the disk 13.

To clamp the disk 20 carrying the second scale to the disk 13, a washer 26 is placed on the shaft between the disk 20 and the hub of the hand wheel 9. The outer end of the shaft 10 is threaded to receive a nut 27 which when tightened moves the hand wheel 9 and the washer 26 inwardly along the shaft to press against the disk 20 and thereby clamp it to the disk 13. Thus, the second scale is adjustably secured to the disk 13.

In the present embodiment, the first scale (the one on the ring 17) makes one complete revolution while the object in the machine is moved the maximum amount of its feed by the rotation of the shaft 10, the ratio of the gear mechanism being selected to produce this result. The first scale is so graduated that a movement thereof of one space is accomplished by one complete revolution of the hand wheel 9. The second scale, being on the disk 20 which is clamped to the disk 13 which, in turn, is keyed to the shaft 10, makes one revolution for each revolution of the shaft. A vernier scale is placed on the stationary ring 21 adjacent the zero mark and cooperating with the second scale to give a finer reading. It is possible, then, to read the number of revolutions made by the shaft from the first scale, while the second scale in conjunction with the vernier permits reading a fraction part of a revolution.

As shown in the drawings, the scales are calibrated to permit reading directly the amount of movement imparted to the member actuated by the rotation of the shaft 10. On the first scale each space represents a movement of .05 of an inch and each space on the second scale represents a movement of .001 of an inch. The vernier permits a reading to .0001 of an inch. In reading the total amount of movement the sum of the three readings is taken.

As hereinbefore mentioned, the scales for indicating the amount of movement of the shaft are capable of being set to a zero indication at any position to which the shaft has been moved so that readings may be taken from that position. Where the readings will be more than the amount of one revolution of the shaft, both of the scales may be set to zero while the shaft is in any given position. The first scale may be set by loosening the set screw 18 and sliding the ring 17 around so that the zero thereon coincides with the zero mark on the stationary ring 21, and then tightening the set screw to lock the first scale. The second scale may be set by unclamping the disk 20 from the disk 13, moving the scale to zero and clamping it again.

To give a specific example, assume that the shaft has been rotated to a given position and it is desired to move the member 1.5632 inches beyond such position and back to said position. When the shaft is in such position, the two scales and vernier are set, as above described, to read zero. The hand wheel is then turned until the first scale on the ring 17 shows 1.55 inches opposite the zero mark, the second scale on the disk 20 shows .013 of an inch and the .0002 of an inch mark on the vernier is directly opposite a mark on the second scale. The sum of these three readings is 1.5632 inches, the desired figure. The hand wheel is then reversely turned to bring the reading back to zero.

When the readings will be less than the amount of one revolution of the shaft, only the second scale need be set.

I claim as my invention:

1. A micrometer device comprising, in combination, a support, a member movable relative to said support, and means for indicating the amount of movement of said member comprising a stationary mark, and two scales movable relative to said mark and in timed relation to each other and to said member, one of said scales indicating the total amount of movement of said member.

2. A micrometer device comprising, in combination, a stationary support, a member movable relative to said support, and means for indicating the amount of movement of said member comprising a stationary mark, and two scales movable in timed relation to each other and to said member, one of said scales cooperating with said mark to give an indication of the total movement of said member and the other of said scales cooperating with said mark and with the first scale to give an indication capable of being read more accurately.

3. A micrometer device comprising, in combination, a stationary support, a member movable relative to said support, and means for indicating the amount of movement of said member comprising a surface rigid with said support having a mark thereon, and two scales, one gross and the other fine, movable in timed relation to each other and to said member and cooperating with said mark to permit reading the amount of said movement, said surface having a vernier scale cooperating with the fine scale to permit of a more accurate reading.

4. A micrometer device comprising, in combination, a stationary support, a member movable relative to said support, and means for indicating the amount of movement of said member comprising a surface rigid with said support and having a mark thereon, a first scale permitting reading the amount of said movement, a second scale permitting, in conjunction with said first scale, a finer reading of the amount of said movement, and a vernier on said surface cooperating with said second scale to permit a still finer reading.

5. A micrometer device comprising, in combination, a stationary support, a shaft rotatably mounted in said support, a hand wheel for rotating said shaft, and means for indicating the amount of movement of said shaft comprising a surface rigid with said support and having a zero mark thereon, and two scales movable by said shaft relative to said zero mark and in timed relation to each other to permit reading the amount of movement of said shaft.

6. A micrometer device comprising, in combination, a stationary support, a member movable relative to said support, and means for indicating the amount of movement of said member comprising a stationary mark, and two cooperating scales movable by said member relative to said mark and in timed relation to each other to permit reading the amount of movement of said member, each of said scales being adjustable relative to said member and to each other to permit reading the amount of movement of said member from any position to which said member has previously been moved.

7. A micrometer device comprising, in combination, a stationary support, a shaft rotatably mounted in said support, and means for indicating the amount of movement of said shaft comprising a cylindrical surface adjustably secured to said support and having a mark thereon, and two cylindrical scales rotatably adjustable to any position relative to said shaft and cooperating with said mark to permit reading of the amount of movement of said shaft from said position.

8. A micrometer device comprising, in combination, a stationary support, a shaft rotatably mounted in said support, and means for indicating the amount of movement of said shaft comprising a stationary zero mark, and two scales movable by the movement of said shaft relative to said zero mark and in timed relation to each other, said scales cooperating with each other to permit reading the total amount of movement of said shaft, the finer of said scales being adapted to be reset to the zero mark from any position to which it has been moved to permit reading the amount of movement of said shaft from said position.

9. A micrometer device comprising, in combination, a stationary support, a shaft rotatably mounted in said support, and means for indicating the amount of movement of said shaft comprising a stationary mark, a first scale movable relative to said mark in timed relation to the movement of said shaft and divided into spaces each of which represents one revolution of said shaft, and a second scale movable relative to said mark directly by said shaft and permitting in conjunction with said first scale reading the amount of movement of said shaft.

10. A micrometer device comprising, in combination, a support, a shaft rotatably mounted in said support, and means for indicating the amount of movement of said shaft comprising a member rigid with said shaft and two scales each separately movable by said member relative to said support and cooperating therewith to permit reading the amount of movement of said shaft.

11. A micrometer device comprising, in combination, a support, a shaft rotatably mounted in said support and means for indicating the amount of movement of said shaft comprising a member fixed to said shaft, a first scale geared to said member, a second scale rigid with said member, and a mark on said support, said scales cooperating with said mark to permit reading the amount of movement of said shaft.

12. A micrometer device comprising, in combination, a stationary support having a zero mark thereon, a shaft rotatably mounted in said support, and means for indicating the amount of movement of said shaft comprising a stationary internal gear, a member rigid with said shaft, a pinion carried eccentrically on said member and meshing with said stationary internal gear, a movable internal gear having a different number of teeth than said stationary internal gear and meshing with said pinion, a first scale on said movable internal gear, and a second scale clamped to said member, said scales cooperating with said zero mark to permit reading the amount of movement of said shaft.

13. A micrometer device comprising, in combination, a stationary support having a zero mark thereon, a shaft rotatably mounted in said support, and means for indicating the amount of movement of said shaft comprising a first internal gear rigid with said support, a member keyed to said shaft, a pinion rotatably mounted on said member eccentrically of said member and meshing with said first internal gear, a second internal gear having a different number of teeth than said first internal gear and meshing with said pinion, said second gear having a scale on the periphery thereof, and a disk clamped to said member and having a second scale on the periphery thereof, said scales cooperating with said zero mark to permit reading the amount of movement of said shaft.

14. A micrometer device comprising, in combination, a stationary support, a shaft rotatably mounted in said support, and means for indicating the amount of movement of said shaft comprising a stationary internal gear secured to said support, a member keyed to said shaft adjacent said stationary gear, a pinion rotatably mounted on said member eccentrically thereof and meshing with said stationary internal gear, a movable internal gear rotatably mounted on said support and meshing with said pinion, said movable internal gear having a different number of teeth than said stationary internal gear and having a scale on the periphery thereof, a disk secured to said member having a scale on the periphery thereof, and a ring secured against rotation to said support and having a zero mark and a vernier thereon, said scales in conjunction with said zero mark and vernier permitting reading of the amount of movement of said shaft.

15. A micrometer device comprising, in combination, a stationary support, a shaft rotatably mounted on said support, a hand wheel keyed to said shaft, and means for indicating the amount of movement of said shaft comprising a stationary internal gear secured to one face of said support, a member keyed to said shaft adjacent said stationary gear, a pinion rotatably mounted on said member eccentrically thereof and meshing with said stationary internal gear, a movable internal gear rotatably mounted between said support and said member and meshing with said pinion, said movable internal gear having a different number of teeth than said stationary internal gear and having a scale on the periphery thereof, a disk mounted adjacent said member having a scale on the periphery thereof, a nut threaded on the end of said shaft for clamping said disk between said member and said hand wheel, and a ring secured to said support and having a zero mark thereon, said scales cooperating with said zero mark to permit reading of the amount of movement of said shaft.

16. A micrometer device comprising, in combination, a stationary support, a shaft rotatably mounted in said support, and means for indicating the amount of movement of said shaft comprising a member rigid with said shaft, a ring geared to said member and having a first scale adjustably secured thereto, a second scale adjustably secured to said member, a stationary ring adjustably secured to said support and having a zero mark thereon, said scales cooperating with said zero mark to permit reading the amount of movement of said shaft.

17. A micrometer device comprising, in combination, a stationary support, a shaft rotatably mounted in said support, and means for indicating the amount of movement of said shaft comprising a stationary internal gear secured to said support, a member keyed to said shaft, a pinion rotatably mounted on said member eccentrically thereof and meshing with said stationary internal gear, a movable internal gear rotatably mounted on said support and meshing with said pinion, said movable internal gear having more teeth than said stationary internal gear, a first scale adjustably secured to said movable internal gear, a second scale adjustably secured to said member, and a ring having a zero mark thereon adjustably secured to said support, said scales cooperating with said zero mark to permit reading of the amount of movement of said shaft.

18. A micrometer device comprising, in combination, a stationary cylindrical support having an annular groove in one face thereof, a shaft rotatably mounted on said support, a hand wheel keyed to said shaft, and means for indicating the amount of movement of said shaft comprising a stationary internal gear secured to said face of said support, a circular plate having a hub keyed to said shaft, said hub abutting the above-mentioned face of said support, a stub shaft mounted on said plate eccentrically thereof and projecting toward said support with its end in said annular groove, a pinion rotatably mounted on said stub shaft and meshing with said stationary internal gear, a movable internal gear mounted between said stationary gear and said plate and having a flange portion encircling a part of said support, said movable gear having the same pitch diameter as said stationary gear but a different number of teeth and meshing with said pinion, a ring adjustably secured to and encircling said support, a second ring encircling said plate and having arms extending to said first ring and secured thereto, said second ring having a zero mark and a vernier on its periphery, a first scale lying between said rings and adjustably secured to said movable gear, a disk mounted on the shaft adjacent the outer face of the plate and having an external flange carrying a second scale, a washer mounted on the shaft between the hand wheel and the disk, and a nut threaded to the end of the shaft to clamp the disk to the plate by forcing the hand wheel and washer against the outer face of said disk.

19. A micrometer device adapted for use in a machine tool comprising, in combination, a support rigid with a stationary part of the machine tool, a shaft rotatably mounted in said support for actuating the feeding mechanism of the machine tool, a hand wheel for rotating said shaft, and means for indicating the amount of movement of said feeding mechanism caused by the rotation of said shaft comprising a stationary mark, and two scales movable by said shaft relative to said mark and in timed relation to each other, said scales cooperating with each other to permit reading the total amount of movement of the feeding mechanism, and both being adapted to be reset from any position to which they have been moved to permit reading the amount of movement of the feeding mechanism from said position.

20. A micrometer device comprising, in combination, a stationary support, a shaft rotatably mounted in said support, and means for indicating the amount of movement of said shaft comprising a stationary mark, and two scales movable by the movement of said shaft relative to said mark and in timed relation to each other, said scales cooperating with each other to permit reading the total amount of movement of said shaft, one of said scales being adapted to be reset to a zero reading from any position to which it has been moved to permit reading the amount of movement of said shaft in either direction from said position.

In testimony whereof, I have hereunto affixed my signature.

JOHN EDGAR.